United States Patent [19]

Williams et al.

[11] 4,219,136
[45] Aug. 26, 1980

[54] PRE-MEASURED AUTOMATIC QUANTITY DISPENSING APPARATUS AND METHODS OF CONSTRUCTING AND UTILIZING SAME

[76] Inventors: Earl V. Williams, 3110 M-155, Howell, Mich. 48843; Diane L. Ostrowski, 7230 Cowell Rd., Brighton, Mich. 48116

[21] Appl. No.: 962,138

[22] Filed: Nov. 20, 1978

[51] Int. Cl.² ............................................. G01F 11/28
[52] U.S. Cl. .................................. 222/450; 222/452; 222/561
[58] Field of Search ......... 312/270; 229/75 C, 17 SC, 229/17 M; 222/424.5, 425, 427-431, 436, 440, 450-453, 456, 457, 361-366, 561; 221/267, 269, 265

[56] References Cited

U.S. PATENT DOCUMENTS

| | | | |
|---|---|---|---|
| 2,500,059 | 3/1950 | Burnham | 222/451 |
| 2,781,955 | 2/1957 | Kidd | 222/561 |
| 2,880,915 | 4/1959 | Kantor | 222/456 |
| 3,000,409 | 9/1961 | Thomasco | 222/430 |
| 3,057,524 | 10/1962 | Shanks | 222/450 |

Primary Examiner—H. Grant Skaggs
Attorney, Agent, or Firm—Irving M. Weiner; John L. Shortley; Melvin Yedlin

[57] ABSTRACT

An apparatus for measuring and dispensing a predetermined quantity of particulate material from a container. The apparatus includes a measuring and dispensing assembly permanently secured at least in part within a container, particularly a disposable container such as a box of dry laundry detergent. The measuring and dispensing assembly defines a chamber within the container which may be opened to permit a predetermined measured quantity of the contents of the container to enter thereinto, and then closed to separate the measured quantity from the remaining contents of the container. To permit dispensing of the measured quantity of particulate material from the closed chamber, the assembly further includes a movable member which may be moved to expose a discharge opening in the container which is adjacent the chamber.

8 Claims, 23 Drawing Figures

PRE-MEASURED AUTOMATIC QUANTITY DISPENSING APPARATUS AND METHODS OF CONSTRUCTING AND UTILIZING SAME

BACKGROUND OF THE INVENTION

1. Field of the Invention

The present invention relates generally to an apparatus for automatically and accurately measuring and dispensing a predetermined quantity of particulate material from a container. The terminology "particulate material" as employed herein is intended to connote any type of particulate material which is commonly used in measured quantities, such as, for example, dry laundry detergent, dry cereal, rice, flour, etc.

In particular, the present invention relates to an apparatus which includes a measuring and dispensing assembly permanently secured within a disposable container to permit particulate material stored in the container to be readily dispensed in accurately measured quantities, without the use of auxiliary measuring means such as measuring cups, etc.

2. Description of the Prior Art

Most commonly-used particulate materials which are packaged and sold in disposable containers are intended for use in measured quantities. For example, dry laundry detergent is normally used in one-cup or similar quantities and food items such as rice, flour, and dry cereal are also desirably used in measured quantities such as one cup, one-half cup, etc.

Normally, the user of a packaged particulate material which is intended for use in particular quantities dispenses the material from an opening in the container or box into a measuring device, such as a measuring cup. In so doing, especially if the box is particularly heavy or cumbersome (such as large boxes of dry laundry detergent), the user ofttimes has a difficult time in attempting to accurately dispense the proper amount of material into the measuring device. Without several steps in dispensing, checking the quantity in the measuring device, dispensing again, checking again, etc., it is quite difficult to obtain any accurately-measured quantity of the particulate material. It is also quite easy to accidentally overfill the measuring device so that some of the particulate material overflows and is wasted and/or some of the material has to be inconveniently returned to the container or box. Further, there is not always a measuring device readily available to the user of such particulate material, and if the user then attempts to estimate the desired amount of material for use by pouring directly from the container, it will be quite improbable that an accurately determined amount of material will be used.

In view of the foregoing, there has developed a general need for some type of means for automatically measuring and dispensing a predetermined quantity of packaged particulate material. Several prior art attempts have been made to provide devices to alleviate the inconvenience and wastage attendant conventional use of auxiliary measuring devices as above described. Illustrative of prior art attempts at automatic measuring and/or dispensing devices are: the "CONTAINER" disclosed in U.S. Pat. No. 2,551,450 issued in 1951 to Minton; the "CONTROLLED MEASURING DISPENSER" disclosed in U.S. Pat. No. 3,036,742 issued in 1962 to Wagoner et al; the "MEASURING AND DISPENSING CANNISTER" disclosed in U.S. Pat. No. 3,178,080 issued in 1965 to Aro; and the "METERING DISPENSING CONTAINER" disclosed in U.S. Pat. No. 3,209,962 issued in 1965 to Wassell. Such prior art attempts, however, have been generally unacceptable for widespread use. Disadvantages attendant such devices include: the complexity of the devices render them too expensive and difficult to mass produce, and susceptible to mechanical failure; and in some cases the devices are even more inconvenient to use than would be the conventional method of dispensing the material into a separate measuring device.

The present invention eliminates the disadvantages and shortcomings attendant the conventional technique and the above set forth prior art devices. The apparatus and method according to the invention provides an accurate and convenient measuring and dispensing system which employs a minimum of parts at a reduced cost of manufacture, and which eliminates the need for auxiliary measuring means.

SUMMARY OF THE INVENTION

The present invention provides an apparatus for measuring and dispensing a predetermined quantity of particulate material. The apparatus includes a disposable container adapted to contain therein a particulate material, the container being provided with a discharge opening through which the particulate material may be dispensed. A measuring and dispensing assembly is disposed substantially within the container proximal to the discharge opening, the assembly being permanently secured at least in part to at least a portion of the interior of the container. The measuring and dispensing assembly includes first means cooperating with an interior portion of the container adjacent the discharge opening for defining a chamber within the container, at least a portion of the chamber extending above the discharge opening of the container when the container is in an upright position; second means cooperating with the first means for permitting the first means to be moved between a first position wherein the chamber is substantially open to permit a portion of the contents of the container to enter and fill the chamber, and a second position wherein the chamber is substantially sealed from the contents of the container; third means disposed adjacent the discharge opening of the container for selectively covering and uncovering the opening; and fourth means cooperating with the third means for permitting the third means to be moved between a first position wherein the third means substantially covers and seals the discharge opening of the container and a second position wherein the discharge opening is substantially uncovered.

It is an object of the invention to provide the measuring and dispensing assembly in a container which is box-shaped, including opposing pairs of side and end walls, and a top and bottom wall, with the discharge opening disposed in the bottom wall of the container adjacent one end wall thereof.

A further object of the invention is to provide a chamber which is particularly dimensioned so as to receive a predetermined measured quantity of particulate material from the contents of the container. Further, the chamber is preferably disposed entirely above the discharge opening of the container when the container is in an upright position to permit the chamber to be filled by the contents of the container due to the force of gravity when the first means is moved to its first position wherein the chamber is open to the contents of the container.

Other details and objects of the invention will become apparent from the following description, when read in conjunction with the accompanying drawings.

DETAILED DESCRIPTION

Figures 1, 2, 3, 4, 5, 6, 7, 8, 9:
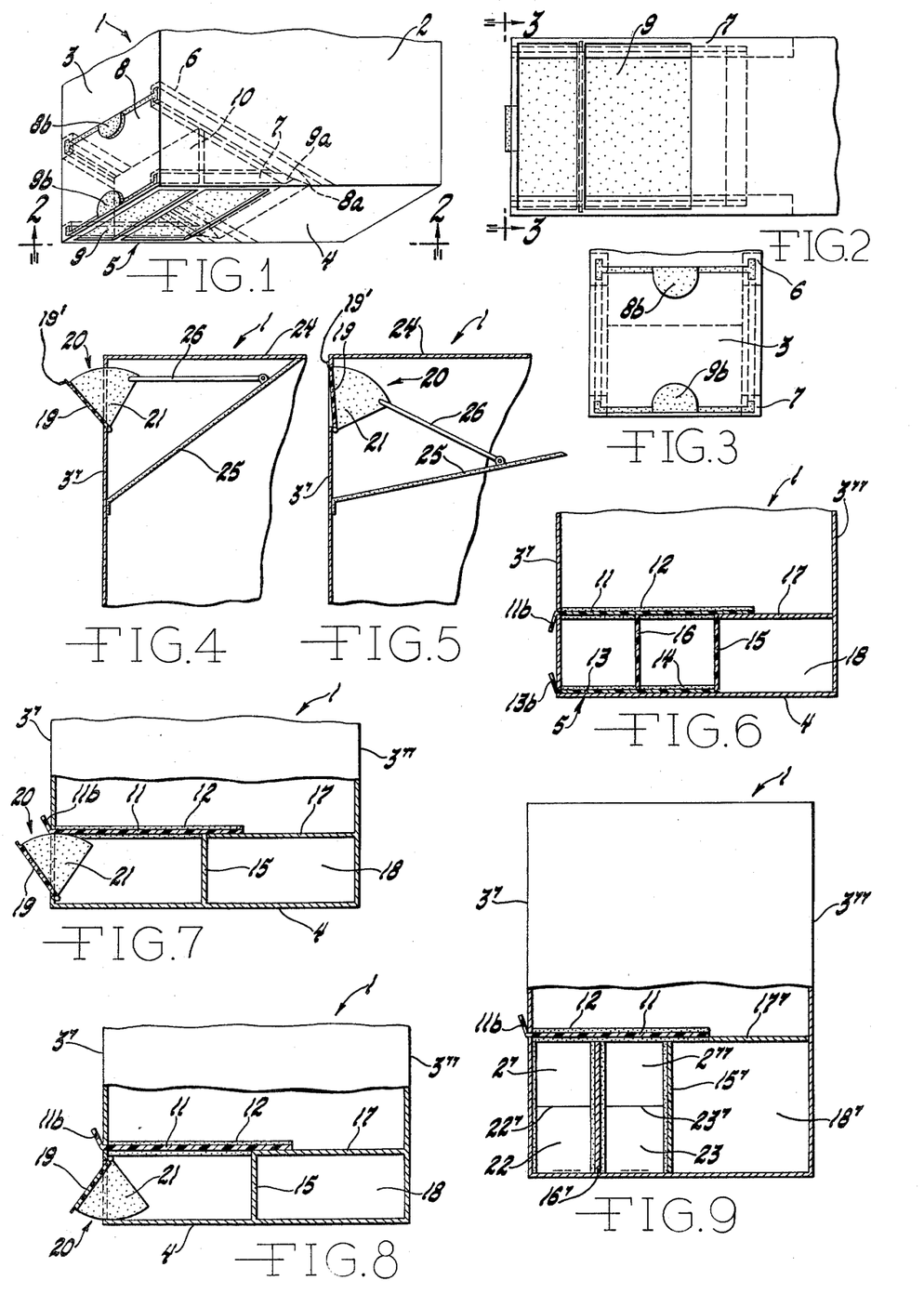
FIG. 1 depicts a sectioned perspective view showing an embodiment of the measuring and dispensing assembly in accordance with the invention.
FIG. 2 is a sectioned bottom view taken along line 2—2 in FIG. 1.
FIG. 3 is a sectioned view of the FIG. 1 embodiment, taken along line 3—3 in FIG. 2.
FIG. 4 illustrates an elevational view of another embodiment of the measuring and dispensing assembly according to the invention, shown in a dispensing position.
FIG. 5 depicts an elevational view of the FIG. 4 embodiment, shown in a chamber-filling position.
FIG. 6 illustrates an elevational view of a further embodiment of the measuring and dispensing assembly.
FIG. 7 depicts an elevational view of a modification of the FIG. 6 assembly.
FIG. 8 illustrates an elevational view of a modification of the FIG. 7 assembly.
FIG. 9 depicts a cut-away rear elevational view of a modification of the FIG. 6 assembly.

With reference to FIGS. 1-3 and 10-15, a first general embodiment of the invention will be described. Referring first to FIG. 1, there is depicted a sectioned view of the apparatus in accordance with the present invention. The apparatus includes a conventional container 1. The container 1 as shown in FIG. 1 (as well as in various other figures) is generally of the disposable heavy-cardboard type often employed for packaging a quantity of particulate material, such as, for example, a conventional box of dry laundry soap or detergent. The box 1 includes opposing pairs of side walls (side wall 2 being visible in FIG. 1) and end walls (end wall 3 being visible in FIG. 1), a top wall (not shown), and a bottom wall 4. The container or box 1 is provided on its bottom wall 4 proximal to end wall 3 with a discharge opening 5 which extends substantially between the opposing side walls (somewhat less than the width of bottom wall 4) and from a point slightly spaced from end wall 3 to approximately the center of bottom wall 4. Disposed proximal to discharge opening 5, in the lower left corner portion of the box 1 as shown in FIG. 1, is a novel measuring and dispensing assembly in accordance with the present invention (shown in dashed lines in FIG. 1).

The measuring and dispensing assembly according to the FIG. 1 embodiment of the invention includes an upper pair of parallel track members 6 disposed obliquely relative to box 1 and extending from an end which is adjacent the inner surface of end wall 3 to an end which is adjacent the central portion of bottom wall 4. The relative ends of track members 6 are tapered to fit flush against the inside surfaces of the box, and the track members are each glued or otherwise affixed at one end to the inside of end wall 3, at the opposite end to the inside of bottom wall 4, and along their side edges to the inside surfaces of the side walls of the box. Also provided is a lower pair of parallel track members 7 which are generally similar in construction to upper track members 6. The lower track members 7 are disposed along the bottom edge of container 1 on opposing sides of opening 5 and are glued or otherwise affixed in place against the lower edges of the side walls of box 1. The lower track members 7 extend from their first ends which are flush against end wall 3 to their second ends which extend substantially against the inner ends of upper track members 6. In this connection, it should be noted that the inner ends of upper track members 6 will contact the inner ends of lower track members 7 at a point near the central portion of bottom wall 4 of box 1, past the inner end of discharge opening 5 of box 1. If desired, the inner ends of the two pairs of track members 6 and 7 may be joined together, or alternatively the two pairs of track members 6 and 7 may be formed integrally as one unit.

The measuring and dispensing assembly in accordance with the FIG. 1 embodiment of the invention further includes an upper insert member 8 which comprises a substantially rigid elongated rectangular plate member adapted to slide along the upper pair of tracks 6. The insert 8 is of a length slightly greater than the lower edges of tracks 6, or the same as the middle portion of track 6, or less than the top portion of track 6, and is tapered at its inner end into a substantially sharp point 8a which is adapted to contact the upper surface of bottom wall 4 of container 1 when insert 8 is fully inserted into container 1 along track members 6. The sharp point 8a of insert 8 further serves to facilitate sliding of insert 8 by cutting through particulate material disposed in container 1 (described in greater detail hereinbelow). The outer end of insert 8 extends substantially flush with end wall 3 of box 1, except for a tab 8b provided on the outer end of insert 8, which tab 8b protrudes beyond the outer surface of end wall 3 of box 1 (see FIG. 3). The tab 8b is preferably either hingedly attached to insert 8 or is sufficiently pliable to permit tab 8b to lay flat against the outside surface of end wall 3 and taped thereagainst for shipping of container or box 1 within other larger boxes, or to be pulled outwardly away from end wall 3 for use in slidably translating insert 8 as will be described hereinbelow.

Figure 13:
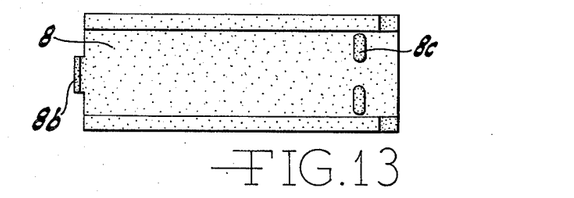
FIG. 13 depicts a top plan view of an upper insert for use in a measuring and dispensing assembly in accordance with the invention.
Figure 14:
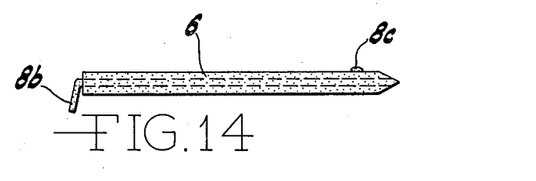
FIG. 14 illustrates a side elevational view of an upper insert and track arrangement for use in a measuring and dispensing assembly in accordance with the invention.

As shown in FIGS. 1 and 3, the longitudinal side edges of insert 8 are provided with an integral T-shaped flange to hold insert 8 in place within corresponding T-shaped longitudinal grooves provided in upper track members 6 for relative sliding movement of insert 8 therein. With reference to FIGS. 13 and 14, the upper surface of insert 8 is provided with a pair of integral stop members 8c which project upwardly from the upper surface of insert 8 proximal to the inner end thereof and function to prevent removal of insert 8 from track members 6 by bearing against the inner surface of end wall 3 when insert 8 is pulled almost entirely outwardly relative to box 1.

The measuring and dispensing assembly in accordance with FIG. 1 also includes a lower insert member 9 adapted for sliding movement in lower track members 7 (FIGS. 1 and 2). The lower insert member 9 is substantially similar in construction to upper insert member 8 as above described. Insert 9 is of a length slightly longer than that of lower track members 7 and is tapered at its inner end into a substantially sharp point 9a which is adapted to butt against a portion of the inner end of upper insert 8 as shown in FIG. 1 when inserts 8 and 9 are fully inserted into container 1 along their respective track members 6 and 7. The outer end of insert 9 extends substantially flush with end wall 3 of box 1, except for tab 9b provided on the outer end of insert 9, which tab 9b protrudes beyond the outer surface of end wall 3 of box 1 (see FIG. 3). Tab 9b is similar in construction to tab 8b of insert 8, and is adapted to be taped substantially flush against the outer surface of end wall 3 for shipping, or to be pulled outwardly away from the end wall 3 for use in slidably translating insert 9 along track members 7. The lower surface of lower insert 9 is adapted to translate along track members 7 in a position substantially flush against the upper surface of bottom wall 4 of box 1.

Figure 15:
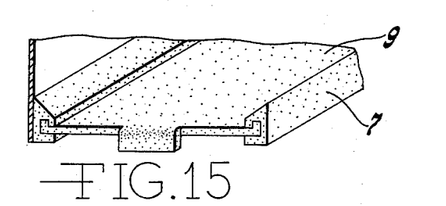
FIG. 15 is a sectioned perspective view of a lower track and insert arrangement.

As shown in FIGS. 1, 3 and 15, the longitudinal side edges of insert 9 are each provided with an integral upwardly-extending longitudinal flange adapted to be received in corresponding longitudinal grooves provided in track members 7 to properly position insert 9 for relative sliding movement along track members 7. Similar to upper insert 8 as described hereinabove with reference to FIGS. 13 and 14, insert 9 may also be desirably provided with a pair of integral stop members (not shown) which are similar to stop members 8c in FIG. 13.

The track members 6 and 7 are preferably fabricated of a substantially rigid lightweight material, such as plastic, and inserts 8 and 9 are also desirably fabricated of rigid lightweight material, such as plastic or stiff reinforced cardboard. Preferably, the upper portions of both pairs of track members 6 and 7 are tapered downwardly as shown in FIG. 15, so as not to impede the flow of particulate material during use of the present invention as will be hereinafter described.

The above described arrangement of slidable inserts 8 and 9 within the lower corner portion of box 1 will serve to define a substantially wedge-shaped chamber when both inserts 8 and 9 are in their fully closed positions as shown in FIG. 1. The upper and lower walls of such chamber will be defined respectively by upper insert 8 and lower insert 9, the end wall of the chamber will be defined by a portion of the inner surface of end wall 3 of box 1, and the side walls of the chamber will be defined by portions of the inner surfaces of the side walls of box 1. When inserts 8 and 9 are in their closed FIG. 1 positions, the thus defined chamber will be entirely sealed-off from the remaining contents of box 1, and will also be sealed from discharging through opening 5 in box 1. It will be understood that the volume of the chamber can be varied by altering the relative angular position of the upper tracks and insert during manufacture and assembly, and the chamber is adapted to contain a predetermined measured quantity of particulate material, such as, for example, a one-cup quantity. If desired, the chamber may be provided with a rigid partition 10 (also constructed of plastic or stiff reinforced cardboard) which is positioned substantially vertically within the chamber so as to divide the volume of the chamber into two equal parts, such as two one-half cup quantities. The partition 10 is glued or otherwise affixed at each side thereof to the inner surfaces of the side walls of box 1 and is adapted to rest adjacent its upper edge against the lower surface of upper insert 8 and adjacent its lower edge against the upper surface of lower insert 9 so as to effectively seal the volume of the chamber into two equal parts. It is contemplated that more than one partition may be employed so as to divide the volume of the chamber into any desired number of parts, although only one such partition 10 is shown in FIG. 1.

In using the invention as described above, the user of the device first removes the tapes holding tabs 8b and 9b against end wall 3 (for shipping purposes). Next, the tab 8b is pulled outwardly so as to slide insert 8 outwardly along track members 6 away from end wall 3 of box 1. The outward sliding of insert 8 will be automatically stopped by stop members 8c bearing against the inner surface of end wall 3 of box 1. In its thus pulled-out position, the inner end of insert 8 will be substantially adjacent the inner surface of end wall 3 of box 1, and the chamber will thus be almost entirely open along its upper portion so as to receive a predetermined portion of the contents of box 1. The particulate material contained in box 1 will flow downwardly into the thus opened chamber between the downwardly-tapered upper track members 6 due to the force of gravity, until the chamber is entirely filled. When the chamber has been thus filled, the user of the apparatus then pushes insert 8 inwardly relative to end wall 3 so that it slides along track members 6 back into its closed position, with the inner end thereof substantially adjacent the inner surface of bottom wall 4 of box 1. In order to discharge the measured quantity of particulate material within the sealed chamber, the user then employs tab 9b to slide lower insert 9 outwardly away from end wall 3 of container 1 until the inner end of insert 9 is substantially adjacent the inner surface of end wall 3 and opening 5 in box 1 is substantially uncovered (which position will be determined automatically if stop members are provided on insert 9). The pre-measured quantity of particulate material contained in the chamber will then be permitted to flow downwardly through discharge opening 5 of box 1, again due to the force of gravity. The lower insert 9 can then be pushed inwardly to slide along track members 7 into its normally-closed position covering discharge opening 5, as shown in FIG. 1.

In using the apparatus as above described, and particularly if the particulate material comprises dry laundry detergent, it is desirable that the box 1 be positioned over the washing machine (or other receptacle) just prior to opening lower insert 9 for dispensing the measured quantity of material from the chamber to permit the material to be discharged directly into the washing machine or other desired receptacle.

If it is desired to discharge only one-half of the pre-measured volume of particulate material from the chamber, the user of the apparatus will slide insert 9 outwardly approximately half-way between its fully open and fully closed positions. To facilitate accurate sliding of insert 9 to the proper half-way position, the upper surface of insert 9 may be provided with marked indications or may be divided into differently-colored regions to clearly indicate to the user of the apparatus that insert 9 has been pulled outwardly far enough to uncover only the innermost one-half volume portion of the chamber.

Figure 10:
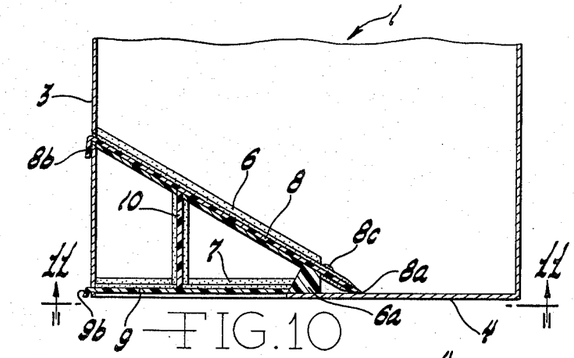
FIG. 10 illustrates a modified form of the assembly shown in FIG. 1.
Figure 11:
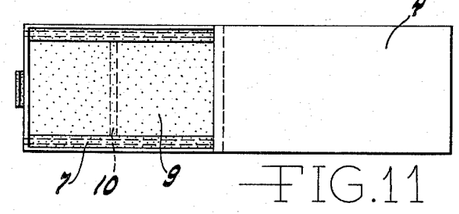
FIG. 11 depicts a bottom plan view taken along line 11—11 in FIG. 10.
Figure 12:
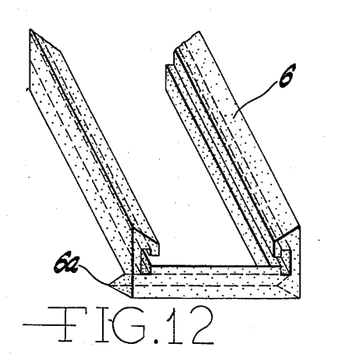
FIG. 12 illustrates a sectional view of the upper track members of FIG. 10.

The measuring and dispensing assembly shown in FIGS. 10, 11 and 12 is substantially similar to the assembly described above with reference to FIGS. 1–3, and like reference numerals are used to indicate corresponding like parts. The FIG. 10 assembly is slightly modified from that of FIG. 1 in that the upper track members 6 are joined together adjacent their inner ends by a downwardly depending portion 6a (FIGS. 10 and 12). The lowermost edge of portion 6a is glued or otherwise affixed to the inner surface of bottom wall 4 of box 1 adjacent the inner ends of lower track members 7 and lower insert 9. The portion 6a includes a downwardly-slanted surface which faces inwardly into the chamber defined by the assembly, and this surface will facilitate the downward discharge of the pre-measured quantity of material from the chamber when insert 9 is moved to its open position as described hereinabove. As also set forth above the downwardly-tapered upper surfaces of lower track members 7 (FIG. 15) will also serve to facilitate the downward discharge of material from the chamber. In a like manner, the tapered upper surfaces of upper track members 6 will serve to facilitate the downward movement of material into the chamber when upper insert 8 is in its open position.

Referring now to FIG. 6, an alternate embodiment of the measuring and dispensing assembly is depicted. In this embodiment, the upper insert member 11 is disposed for relative sliding movement within a pair of parallel upper track members 12 in substantially the same relative arrangement as the upper track members 6 and insert 8 described with reference to FIG. 1. However, in this embodiment, the upper track members 12 and sliding insert 11 are substantially horizontally disposed in the lower portion of box 1, parallel to bottom wall 4 of box 1. Lower track members 14 and lower insert 13 are substantially similar in construction and relative positions to lower track members 7 and insert 9 of FIG. 1. Alternatively, lower track members 14 may be disposed below the outer surface of bottom wall 4 of box 1 and glued or otherwise affixed thereto, and insert 13 will slide flush against the outer surface of bottom wall 4. If this arrangement is employed, the track members 14 should extend the full length of bottom wall 4 to ensure proper seating of box 1.

Tabs 11b and 13b provided respectively on upper insert 11 and lower insert 13 are structurally and functionally identical to tabs 8b and 9b described hereinabove, and are respectively grasped by the user of the apparatus to effect horizontal sliding movement of the upper insert 11 and lower insert 13 along their respective track members. It should also be understood that the inner end of insert 11 is preferably formed into a substantially sharp point comparable to point 8a described hereinabove in connection with insert 8.

A substantially box-shaped chamber is defined between the upper insert 11, lower insert 13, and the inner surfaces of the side walls of box 1, and the end portions of the chamber are defined respectively by the inner surface of end wall 3' of box 1 at one end and a substantially vertically disposed partition 15 at the opposite end. Vertical partition 15 is glued or otherwise affixed to the inner surfaces of the two opposing side walls of box 1 and is further affixed at its lower end to the inner surface of bottom wall 4 of box 1. The upper end of partition 15 rests flush against the lower surface of upper insert 11. The inner ends of lower track members 14 are flush against and secured to partition 15 and insert 13 is flush against partition 15 when it is in its fully closed position as shown in FIG. 6. A vertical partition 16, disposed in substantially the same manner as partition 10 described hereinabove, functions to separate the volume of the chamber into two equal parts. A horizontal partition member 17 extends between partition 15 and end wall 3" of box 1 and defines an empty space 18 therebeneath, which space 18 is equal in height to the chamber defined below upper insert 11. Empty space 18 may be employed to contain a bonus gift from the manufacturer, or may be employed for any other suitable purpose. The inner ends of upper track members 12 extend slightly over and are secured to the upper surface of partition 17 as shown, and the inner end of upper insert 11 extends over a portion of space 18 when insert 11 is in its fully closed position.

The FIG. 6 embodiment of the invention functions in substantially the same manner as described hereinabove with reference to FIG. 1. Due to the provision of empty space 18 adjacent the pre-measuring chamber, the contents of box 1 will be disposed entirely above the upper portion of the chamber. When the box 1 has been completely emptied of its contents, the user of the apparatus will then have access to the contents of empty space 18 by breaking through partition 17 or by any suitable access means which may optionally be provided.

With reference now to FIG. 7, the chamber within box 1 is defined in much the same manner as in the FIG. 6 embodiment, however, the bottom insert and track arrangement is omitted and the bottom wall 4 of box 1 is continuous and includes no discharge opening. In this embodiment, the chamber for containing a pre-measured quantity of particulate material is defined between upper insert 11 and bottom wall 4 and the opposing side walls of box 1. The upper insert 11 and upper track members 12 are disposed in substantially the same manner as described hereinabove with reference to FIG. 6, except that tab 11b extends upwardly so as not to interfere with a spout 20. A vertical partition 15 defining one end of the chamber and a horizontal partition 17 defining an empty space 18 are also provided in the same manner as described with reference to FIG. 6. In this embodiment, box 1 is provided with a discharge opening adjacent the lower edge of end wall 3', and the opening is selectively covered and uncovered by a front wall 19 of spout 20. The spout 20 (which is nearly as wide as end wall 3') includes substantially V-shaped side walls 21 and is pivotably connected at its lower end to the inner surface of end wall 3' of box 1 adjacent bottom wall 4.

In using the apparatus as shown in FIG. 7, the user slides upper insert 11 outwardly along tracks 12 in the same manner as described hereinabove with reference to FIG. 1 to permit a portion of the contents of box 1 to enter and fill the chamber. Insert 11 is then slid back inwardly to its closed position as shown in FIG. 7 to seal the chamber from the remaining contents of box 1. To then dispense the pre-measured quantity of material disposed in the chamber, spout 20 is pivoted outwardly to the position shown in FIG. 7, and the box is tipped so as to dispense the pre-measured material through the discharge opening provided in box 1. To close the chamber from the ambient, spout 20 is then pivoted inwardly until the front wall 19 thereof is in a substantially vertical position so as to entirely cover the discharge opening of box 1.

With reference to FIG. 8, the measuring and dispensing assembly is substantially identical to the assembly described above with respect to FIG. 7, except that in this modification the spout 20 is pivotably secured to the inner surface of end wall 3' of box 1 at the upper end of spout 20 rather than the lower end thereof as shown in FIG. 7.

Referring now to FIG. 9, there is depicted a cut-away rear view of another embodiment of the measuring and dispensing assembly according to the present invention. In this embodiment, the arrangement of upper track members 12 and slidable upper insert 11 is much the same as described hereinabove with regard to FIGS. 1 and 6. As described with reference to FIG. 6, a horizontal partition 17' defines an empty space 18' which may be employed for storing bonus gifts from the manufacturer. As in FIG. 7, the chamber for holding the pre-measured quantity of material is defined between the upper insert 11, the continuous bottom wall 4 of box 1, the end wall 3' of box 1, and a vertical partition 15' which is similar to partition 15 in FIG. 6. A partition 16' is disposed to divide the volume of the chamber into two equal parts, and is secured within box 1 in the same manner as partition 16 described above.

In this embodiment of the invention, filling and sealing of the chamber is accomplished in much the same manner as described hereinabove with regard to upper insert 11 and track members 12. For discharging the pre-measured quantity of material from the chamber, there is provided a discharge opening in a side wall portion of box 1 which is covered by a pair of vertically slidable inserts 22 and 23. The inserts 22 and 23 are each provided with corresponding track members in substantially the same manner as described above regarding the various other embodiments, the track members extending vertically upwardly from the inner surface of bottom wall 4 of box 1 to the lower surface of track members 12. When it is desired to dispense the pre-measured material from the chamber, each of the slidable inserts 22 and 23 is translated upwardly along its respective track members until its upper respective end (22' or 23') is disposed adjacent upper track members 12. If the user desires to dispense only half the volume of the chamber, then only one of the inserts 22 and 23 need be slid to its open position. The inserts 22 and 23 may be selectively disposed to slide flush against either the inner or outer surfaces of side wall portions 2' and 2" of box 1 when the inserts are moved to their open position to uncover the discharge opening provided in side wall 2 of box 1. Each of the inserts 22 and 23 are provided with tabs (shown in dashed lines) in a like manner as described above with regard to the various other inserts. It is also contemplated that a vertically sliding insert comparable to insert 22 or 23 may be alternatively disposed to cover a discharge opening which may be provided in end wall 3' (rather than a side wall) of box 1, and further that the vertically sliding inserts may be replaced by outwardly movable flaps.

With reference now to FIG. 4, an alternative embodiment of the measuring and dispensing assembly according to the invention is depicted. In this embodiment, the chamber for containing the measured amount of particulate material is provided in the upper left corner portion of a container or box 1 as shown in FIG. 4.

An elongated rectangular plate member 25 is pivotably affixed at its lower end to the inner surface of end wall 3' of box 1. In its closed position as shown in FIG. 4, plate 25 extends at its upper end into contact with the inner surface of top wall 24 of box 1 and defines one wall of a sealed chamber having a triangular cross section. The upper wall of the chamber is defined by top wall 24 of box 1, the end of the chamber is defined by end wall 3' of box 1, and the sides of the chamber are defined by opposing side wall portions of box 1.

Plate 25 is pivotally connected at a point slightly spaced from its uppermost edge to a rigid rod member 26. The opposite end of rigid rod 26 is pivotally connected to an inner corner portion of a side wall 21 forming a part of spout 20. Spout 20 is constructed substantially identically as described hereinabove regarding FIG. 7, and includes a front wall 19. The spout 20 is pivotally secured at its lower end to the inner surface of end wall 3' of box 1 at a point slightly below the lower edge of a discharge opening provided in end wall 3' of box 1. The discharge opening provided in box 1 extends upwardly to a point slightly spaced from top wall 24 of box 1. Thus, it will be seen that the uppermost portion of the chamber defined within box 1 is disposed above the uppermost end of the discharge opening.

To operate the FIG. 4 assembly, reference is first made to FIG. 5. In FIG. 5, the assembly is shown in its open-chamber condition wherein the contents of box 1 are free to enter through the opening provided between the upper end of plate 25 and the lower surface of top wall 24 of box 1. In such open-chamber condition, plate 25 extends substantially parallel to top wall 24 of box 1, as shown in FIG. 5. To ensure that the chamber is properly filled, the user of the apparatus has merely to partially invert or tip box 1 to permit particulate material to flow freely into the chamber. When the chamber is being thus filled, the spout 20 is in its closed position with front wall 19 thereof in a substantially vertical position so as to completely cover the discharge opening in box 1 to thus seal the chamber from the ambient. When the chamber has been filled and it is desired to dispense the pre-measured quantity of particulate material disposed therein, the user of the apparatus has merely to pull front wall 19 outwardly away from end wall 3' via a tab portion 19' of wall 19 to move spout 20 to its open position as shown in FIG. 4. As spout 20 is opened, rod 26 connected thereto will pull plate 25 forwardly until the upper end thereof rests against the inner surface of top wall 24 of box 1, as shown in FIG. 4. The user of the apparatus then merely tips box 1 so as to dispense the measured quantity of material from the chamber through the discharge opening which is substantially uncovered, and out of the spout 20. The chamber will remain sealed from the remaining contents of box 1 due to the closed position of plate 25 against top wall 24. After dispensing is completed, front wall 19 of spout 20 is pushed back into its substantially vertical FIG. 5 position covering the discharge opening, and plate 25 will in turn be returned via rod 26 to its open-chamber position of FIG. 5.

It is contemplated that the plate 25, spout 20 and rod 26 may each be formed of any substantially rigid and lightweight material such as, for example, plastic.

Figure 16:
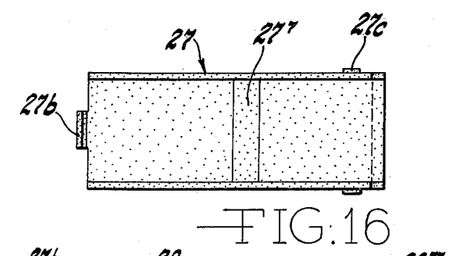
FIG. 16 depicts a top plan view of a lower insert member according to the invention.
Figure 17:
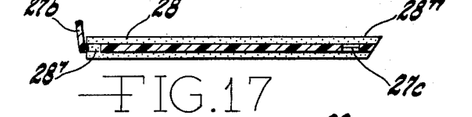
FIG. 17 illustrates a side elevational view of the insert member of FIG. 16 mounted in a lower track arrangement.

With reference now to FIGS. 16 and 17, an alternate lower insert and track arrangement is shown which may be incorporated for use in any embodiment of the invention which includes a sliding lower insert. The insert 27 is substantially of the same construction as lower insert 9 described above. A central portion 27' of the upper surface of insert 27 is provided with a colored strip portion which is employed for determining when only a one-half segregated portion of the measuring chamber has been uncovered for dispensing when a partition 10 is employed as shown in FIG. 10. The insert 27 includes a pair of outwardly projecting members 27c which are adapted to ride in corresponding longitudinal slots formed in lower track members 28 as shown in FIG. 17. The members 27c will function as stop members when insert 27 is pulled outwardly (to the left in FIG. 17) until members 27c butt against the unslotted outer portion 28' of track members 28. The unslotted portion 28' of track members 28 extends approximately ¼" from the outer end of track members 28. In this manner, the members 27c and corresponding track slots arrangement function to prevent accidental removal of lower insert 27 from track members 28. To assemble this insert and track arrangement during manufacture, the insert 27 is preferably introduced to track members 28 through the inner ends 28" of the track members.

Figure 18:
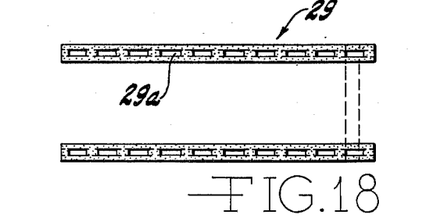
FIG. 18 depicts a bottom plan view of a pair of upper track members for use in a measuring and dispensing assembly according to the invention.

Referring now to FIG. 18, there is depicted a bottom view of a pair of upper track members 29 desirable for use in the embodiments of the invention which include upper track and insert members. Each of the track members 29 are provided with a series of spaced relief slots 29a which function to receive trapped particulate material as the upper insert is translated along the track members.

Figure 19:
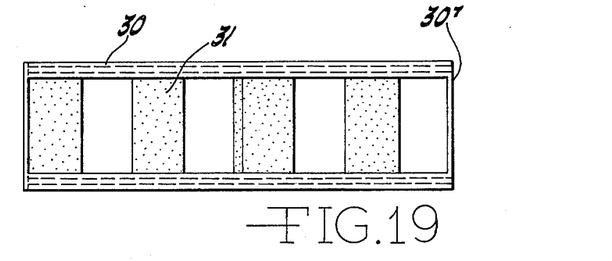
FIG. 19 illustrates an alternative upper track member arrangement.
Figure 20:
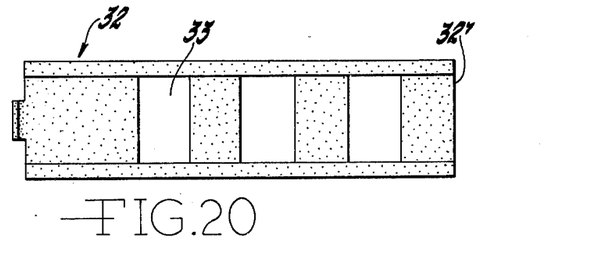
FIG. 20 depicts an alternative upper insert member for use with the track arrangement of FIG. 19.

With reference to FIGS. 19 and 20, an alternative upper track member and insert arrangement is illustrated. In this arrangement, the upper track members 30 (FIG. 19) are joined together with spaced rectangular solid portions 31 of rigid material. In FIG. 20 is depicted an upper insert member 32 which is provided with sharp edges and spaced open portions 33, in contrast to the continuous insert constructions described hereinabove.

In use, the insert 32 is received by track members 30, and when the inner end 32' of insert 32 is brought flush with the inner end 30' of track members 30 the insert and track members will be respectively arranged such that the openings 33 in insert 32 are disposed above the solid portions 31 of track members 30. In this manner, the alternating spaces 33 of insert 32 will be covered by the solid portions 31 of track members 30, while the alternating spaces of track member assembly 30 will be covered by the solid portions of insert 32. Thus, in a fully closed position, insert 32 and track member assembly 30 will together provide a substantially continuous sealing surface so as to effectively close a chamber for containing a measured amount of particulate material, such as the chamber described with reference to FIG. 10. The arrangement of insert 32 and track members 30 provide the advantage that the user need slide insert 32 outwardly from box 1 only far enough to permit the spaced open portions of insert 32 to be aligned with the open portions of track member arrangement 30 when it is desired to open the chamber to permit the contents of the box to flow thereinto. The insert 32 will thus have to be pulled out only a fraction of the distance required of the above-described continuous upper insert 8 when it is desired to open the chamber. It is contemplated that indicating means may be provided on the upper surface of insert 32 to indicate to the user of the apparatus that insert 32 has been translated sufficiently to align the relative spaced openings and solid portions of the track members and insert. Further, it is to be understood that any desired number of spaced openings and solid portions may be provided on insert 32 and track member arrangement 30.

Figure 21:
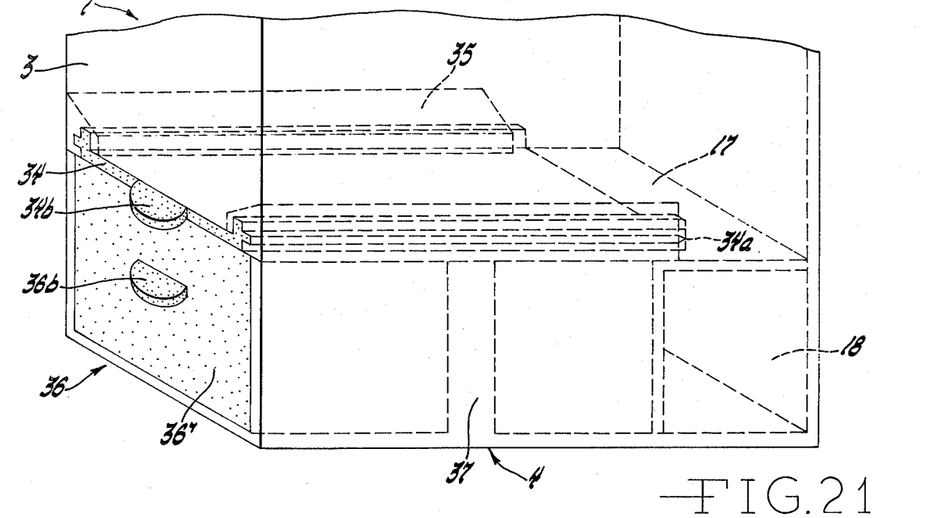
FIG. 21 illustrates a sectioned perspective view showing a further modified embodiment of the measuring and dispensing assembly.
Figure 22:
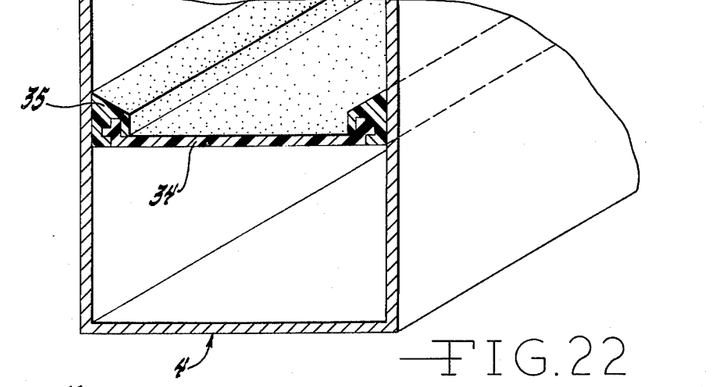
FIG. 22 depicts a sectioned end perspective view, cut-away to show the upper track members and insert employed in the FIG. 21 embodiment.
Figure 23:
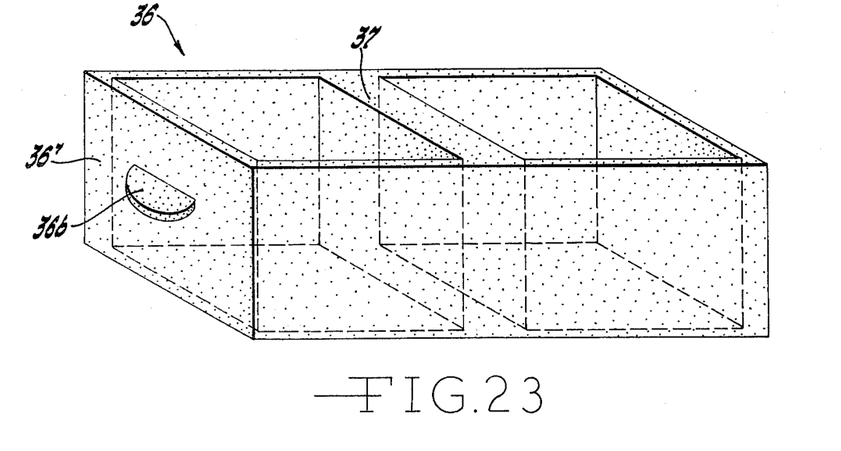
FIG. 23 depicts a perspective view of a drawer member for use in the FIG. 21 embodiment of the invention.

In connection with FIGS. 21–23, there is shown an alternate embodiment of the measuring and dispensing assembly according to the invention. As shown in FIG. 21, the lower interior corner portion of box 1 is provided with a pair of parallel substantially horizontal upper track members 35 and an insert 34 cooperating therewith, in substantially the same relative arrangement as the upper track members 12 and insert 11 described hereinabove with reference to FIG. 6. The box 1 in this embodiment of the invention is provided with a continuous bottom wall 4 which extends fully between the opposing end walls, without any openings therein.

The track members 35 include downwardly-tapered upper surfaces which serve to facilitate downward discharge of material as will be discussed hereinbelow. Track members 35 are glued or otherwise affixed to the inner surfaces of the side walls of box 1, with the outer ends thereof glued or otherwise affixed to the inside surface of end wall 3 of box 1. The inner ends of track members 35 extend to a point somewhat spaced from the end wall opposite end wall 3, as shown in FIG. 21. Insert 34 is slidably received within track members 35, and includes a sharp inner point 34a which serves to facilitate sliding of insert 34 by cutting through particulate material disposed in box 1. The outer end of insert 34 is provided with an integral tab 34b which protrudes beyond the outer surface of end wall 3 of box 1 and may be taped thereagainst for shipping purposes or pulled outwardly away from end wall 3 for use in slidably translating insert 34 as will be described hereinbelow.

A drawer member 36 is disposed below insert 34 within box 1, and is adapted to be slidably translated within the space defined between the opposing side walls of box 1, the lower surface of insert 34 and track members 35, and the upper or inner surface of bottom wall 4 of box 1, through a suitable opening provided in end wall 3 of box 1 adjacent bottom wall 4. As shown in FIG. 23, drawer 36 comprises a four-walled member including end wall 36', an opposing end wall, and opposing side walls. The drawer 36 is topless and bottomless, and also includes a central partition member 37 which extends between the opposing side walls of drawer 36. A tab member 36b is provided on end wall 36' to protrude outwardly from end wall 3 of box 1 for use in translating drawer 36 as will be discussed hereinbelow.

The drawer 36 is adapted to be snugly received within the aforementioned space defined between the opposing side walls of box 1, the lower surface of insert 34 and track members 35, and the upper or inner surface of bottom wall 4 of box 1, which space is clearly depicted in FIG. 22. When drawer 36 is disposed within box 1 as shown in FIG. 21, end wall 36' of drawer 36 will substantially cover and seal the opening in box 1, and the rear end wall thereof will be disposed substantially spaced from the end wall of box 1 to thus define an empty space 18 therebehind, which space 18 is provided with an upper horizontal partition 17 to permit space 18 to be employed for containing a bonus gift from the manufacturer, etc.

The inner ends of track members 35 and insert 34 extend substantially over empty space 18 as shown in FIG. 21, thus ensuring that insert 34 will effectively seal the contents of drawer 36 from the remaining contents of box 1. As shown in FIG. 22, insert 34 is flanged so as to be locked within the longitudinal grooves of track members 35 in a manner which defines a substantially continuous flat surface against which the upper edges of drawer 36 are adapted to slide, to thus prevent any excess material from entering drawer 36 when insert 34 is moved to a closed position.

To employ this embodiment of the invention for discharging a predetermined quantity of material from box 1, insert 34 and drawer 36 are both initially fully inserted within box 1 as shown in FIG. 21. To enable particulate material contained within box 1 to fall by the action of gravity into drawer 36, insert 34 is fully pulled outwardly by means of tab 34b (as in the above embodiments, insert 34 may be preferably provided with stop members to prevent entire removal of insert 34 from track members 35). The insert 34 is pulled by grasping tab 34b, and is thereafter returned to its fully inserted position within box 1 to thus seal the contents of drawer 36 from the remaining contents of box 1. The measured amount of material is then discharged from drawer 36 by pulling outwardly on tab 36b. The partition 37, which is substantially wide relative to the walls of drawer 36, functions to divide the volume of drawer 36 into two substantially equal parts. Thus, when drawer 36 is pulled outwardly from box 1 until partition 37 comes into alignment with end wall 3 of box 1, substantially half of the contents of drawer 36 will be discharged. Thereafter, if it is desired to discharge the remaining contents of drawer 36, the drawer 36 is further pulled outwardly until the inner end wall thereof comes into alignment with end wall 3 of box 1, with drawer 36 thus in a fully outwardly extended position relative to box 1. As the drawer 36 is pulled outwardly, the material will be dispensed downwardly through the open bottom portion of the drawer 36 due to the force of gravity.

It should be noted that drawer 36 is preferably provided with at least one stop member (not shown) for preventing complete removal of drawer 36 from box 1, however, if desired, drawer 36 may be removable from box 1. In addition, it will be understood that any number of partitions 37 may be employed to divide the volume of drawer 36 into parts of any desired size and number, and if desired the drawer 36 may be provided without any partition 37.

The present invention further contemplates a modified embodiment (not shown) substantially similar to the embodiment of FIGS. 21-23, wherein drawer 36 is adapted to slide in and out of an opening provided in a side wall of box 1, rather than an opening provided in end wall 3 of box 1 as described with respect to FIGS. 21-23. In such modified embodiment, the drawer 36 is provided with tab 36b on the outer side wall thereof, any partition 37 which may be desired extends in parallel relation to the side walls (rather than the end walls), and empty space 18 is disposed on the side of drawer 36 within box 1. In such modified embodiment, drawer 36 is employed to dispense a measured quantity of particulate material in much the same manner as described hereinabove with respect to FIGS. 21-23, however, the drawer 36 will be pulled outwardly and pushed into the side wall of box 1, rather than end wall 3 thereof.

It is contemplated that drawer 36, track members 35 and insert 34 are preferably fabricated of substantially rigid material such as plastic, or any other suitable material.

Although there have been described what are at present considered to be the preferred embodiments of the invention, it will be understood that various modifications may be made therein, without departing from the spirit or essential characteristics thereof. The present embodiments are therefore to be considered in all respects as illustrative, and not restrictive. The scope of the invention is indicated by the appended claims rather than by the foregoing description.

We claim:

1. An apparatus for measuring and dispensing a predetermined quantity of particulate material, comprising:
    a box-shaped disposable container including opposing pairs of side and end walls, and a top and bottom wall;
    said container being provided with a discharge opening disposed in said bottom wall adjacent one end wall of said container; and
    a measuring and dispensing assembly including:
        a first rigid plate insert disposed in the lower inner portion of said container above said discharge opening so as to define a chamber within said container, said chamber being disposed above said discharge opening when said container is in an upright position;
        a first pair of track members adapted to slidably receive said first insert, said first track members being each respectively obliquely secured to the inner surfaces of said opposing pair of side walls of said container and extending between said one end wall and a central portion of said bottom wall of said container;
        a second rigid plate insert disposed adjacent said discharge opening for selectively covering and uncovering said opening;
        a second pair of track members adapted to slidably receive said second insert, said second track members being each respectively secured to the inner surfaces of said opposing pair of side walls substantially adjacent said bottom wall of said container and extending between said one end wall and a central portion of said bottom wall of said container;
        said first insert being disposed substantially exteriorly of said container in a first position thereof wherein said chamber is substantially open to permit a portion of the contents of said container to enter and fill said chamber, and substantially interiorly of said container in a second position thereof wherein said chamber is substantially sealed from the contents of said container;
        said second insert being disposed substantially interiorly of said container in a first position thereof wherein said second insert substantially covers and seals said discharge opening, and substantially exteriorly of said container in a second position thereof wherein said discharge opening is substantially uncovered;
said chamber being dimensioned so as to receive a predetermined measured quantity of particulate material;
said chamber being substantially wedge-shaped and defined between said first insert in said second position thereof, said second insert in said first position thereof, said one end wall of said container, and opposing side wall portions of said container;
a tab member disposed on one end of said first insert so as to extend outside said one end wall of said container; and
a tab member disposed on one end of said second insert so as to extend outside said one end wall of said container.

2. An apparatus in accordance with claim 1 wherein:
said first and second insert members are each provided with stop means for preventing said insert members from being entirely removed from said container.

3. An apparatus in accordance with claim 1, wherein:
said measuring and dispensing assembly further includes a partition member disposed within said chamber in a substantially vertical position to divide the volume of said chamber into two equal parts.

4. An apparatus for measuring and dispensing a predetermined quantity of particulate material, comprising:
a disposable container adapted to contain therein a particulate material;
said container being provided with a discharge opening through which said particulate material may be dispensed from said container;
a measuring and dispensing assembly disposed substantially within said container proximal to said discharge opening, at least a portion of said assembly being permanently secured to at least a portion of the interior of said container;
said container being substantially box-shaped and including opposing pairs of side and end walls, and a top and bottom wall;
said discharge opening being disposed in one end wall of said container adjacent the top wall of said container;
said measuring and dispensing assembly including:
first means cooperating with an interior portion of said container adjacent said discharge opening for defining a chamber within said container, at least a portion of said chamber extending above at least a portion of said discharge opening of said container when said container is in an upright position;
second means cooperating with said first means for permitting said first means to be moved between a first position wherein said chamber is substantially open to permit a portion of the contents of said container to enter and fill said chamber, and a second position wherein said chamber is substantially sealed from the contents of said container;
third means disposed adjacent said discharge opening for selectively covering and uncovering said opening;
fourth means cooperating with said third means for permitting said third means to be moved between a first position wherein said third means substantially covers and seals said discharge opening and a second position wherein said discharge opening is substantially uncovered;
said first means comprising a rectangular plate member, said chamber being defined between said plate member, said top wall of said container, a portion of said one end wall of said container, and portions of the opposing side walls of said container;
said third means comprising a spout member having a front wall thereof pivotably secured to selectively cover said discharge opening;
said second means comprising a rod connected between a portion of said spout member and said plate member; and
said fourth means comprising a tab portion provided on said front wall of said spout member.

5. An apparatus for measuring and dispensing a predetermined quantity of particulate material, comprising:
a disposable container adapted to contain therein a particulate material;
said container being provided with a discharge opening through which said particulate material may be dispensed from said container;
a measuring and dispensing assembly disposed substantially within said container proximal to said discharge opening, at least a portion of said assembly being permanently secured to at least a portion of the interior of said container;
said container being substantially box-shaped and including opposing pairs of side and end walls, and a top and bottom wall;
said discharge opening being disposed in an end wall of said container adjacent said bottom wall of said container;
said measuring and dispensing assembly including:
first means cooperating with an interior portion of said container adjacent said discharge opening for defining a chamber within said container, at least a portion of said chamber extending above at least a portion of said discharge opening when said container is in an upright position;
second means cooperating with said first means for permitting said first means to be moved between a first position wherein said chamber is substantially open to permit a portion of the contents of said container to enter and fill said chamber, and a second position wherein said chamber is substantially sealed from the contents of said container;
third means disposed adjacent said discharge opening for selectively covering and uncovering said opening;
fourth means cooperating with said third means for permitting said third means to be moved between a first position wherein said third means substantially covers and seals said discharge opening and a second position wherein said discharge opening is substantially uncovered;
said first means of said measuring and dispensing assembly being disposed in the lower inner portion of said container above said discharge opening to permit said chamber to be filled by the contents of said container due to the force of gravity when said first means is moved to said first position wherein said chamber is open, with said container in an upright position;

said chamber being dimensioned so as to receive a predetermined measured quantity of particulate material;

said first means comprising a rigid rectangular plate insert;

said second means comprising a pair of track members adapted to slidably receive said insert, said track members being each respectively secured to the inner surfaces of said opposing pair of side walls in a substantially horizontal position parallel to said bottom wall of said container;

the lower surfaces of said track members and the lower surface of said insert being substantially coplanar to define a substantially continuous flat surface;

said track members being disposed so as to extend between said end wall and a portion of said container spaced from the opposing end wall of said container;

said fourth means comprising a bottomless and topless box-shaped drawer having opposing end walls and side walls and adapted to be substantially tightly received through said discharge opening in a space defined between said substantially continuous flat surface, the inner surfaces of said opposing side walls of said container, and the inner surface of said bottom wall of said container; and said third means comprising a substantially vertical end wall of said drawer.

6. An apparatus in accordance with claim 5, wherein:
the outer surface of said end wall of said drawer is provided with a tab member;

said insert is provided with a tab member adjacent the outer end of said insert;

said drawer includes at least one substantially vertical integral partition member;

said chamber is substantially box-shaped and is defined between said continuous flat surface, the inner surface of said bottom wall of said container, said opposing side walls of said drawer, and said opposing end walls of said drawer;

said track members and said insert extend inwardly into said container a greater distance than the distance between said end walls of said drawer; and a substantially horizontal partition member is disposed between the upper end of the inner vertical end wall of said drawer and the end wall of said container opposite said one end wall thereof to define an empty space adjacent to said chamber and having a height equal to the height of said chamber.

7. An apparatus for measuring and dispensing a predetermined quantity of particulate material, comprising:
a substantially box-shaped disposable container adapted to contain therein a particulate material and including opposing pairs of side and end walls, and a top and bottom wall;

said container being provided with a discharge opening through which said particulate material may be dispensed from said container, said discharge opening being disposed in the bottom wall of said container adjacent one end wall of said container;

a measuring and dispensing assembly disposed substantially within said container proximal to said discharge opening;

said measuring and dispensing assembly including:
a first rigid rectangular plate insert disposed in the lower inner portion of said container above said discharge opening so as to define a chamber within said container, said chamber being disposed above said discharge opening when said container is in an upright position;

said chamber being dimensioned so as to receive a predetermined measured quantity of particulate material;

a first pair of track members adapted to slidably receive said first insert, said first track members being each respectively secured to the inner surfaces of said opposing pair of side walls in a substantially horizontal position parallel to said bottom wall of said container;

said first track members being disposed so as to extend between said one end wall and the central portion of said container;

a substantially vertical partition member disposed in said central portion of said container extending upwardly from said bottom wall into contact with the inner ends of said first track members;

a second rigid rectangular plate insert;

a second pair of track members adapted to slidably receive said second insert, said second track members being each respectively secured to the inner surfaces of said opposing pair of side walls adjacent said bottom wall of said container and extending between said one end wall and the central portion of said bottom wall of said container;

said first insert being disposed substantially exteriorly of said container in a first position thereof wherein said chamber is substantially open to permit a portion of the contents of said container to enter and fill said chamber, and substantially interiorly of said container in a second position thereof wherein said chamber is substantially sealed from the contents of said container;

said second insert being disposed substantially interiorly of said container in a first position thereof wherein said second insert substantially covers and seals said discharge opening, and substantially exteriorly of said container in a second position thereof wherein said discharge opening is substantially uncovered;

said chamber being substantially box-shaped and being defined between said first insert in said second position thereof, said second insert in said first position thereof, said one end wall of said container, said vertical partition member, and opposing side wall portions of said container;

a tab member disposed on one end of said first insert and adapted to extend outside said one end wall of said container to permit a user to slide said first insert along said first track members between said second and first positions of said first insert; and a tab member disposed on one end of said second insert and adapted to extend outside said one end wall of said container to permit a user to slide said second insert along said second track members between said first and second positions of said second insert.

8. An apparatus in accordance with claim 7, wherein:
a substantially horizontal partition member is disposed between the upper end of said vertical partition member and the end wall of said container opposite said one end wall thereof to define an empty space adjacent to said chamber and having a height equal to the height of said chamber.

* * * * *